INVENTOR
Fernand S. Lapeyre
BY Wilkenson, MacKinney & Thibaut
ATTORNEYS

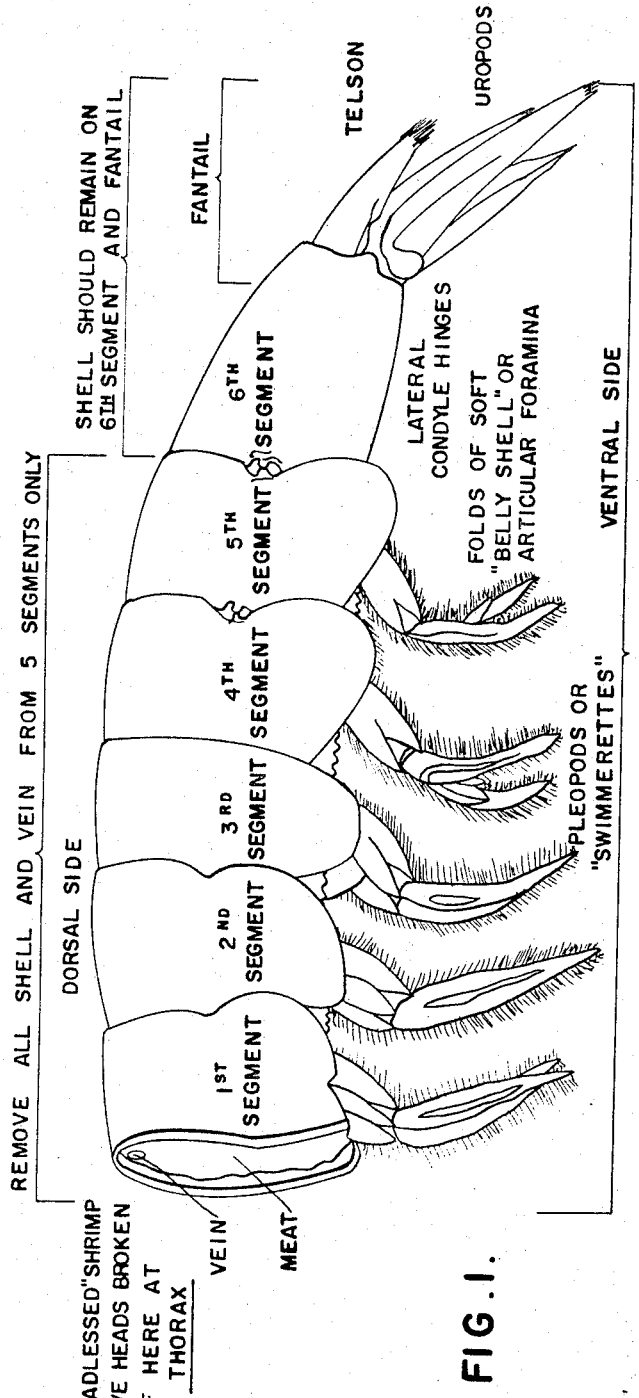
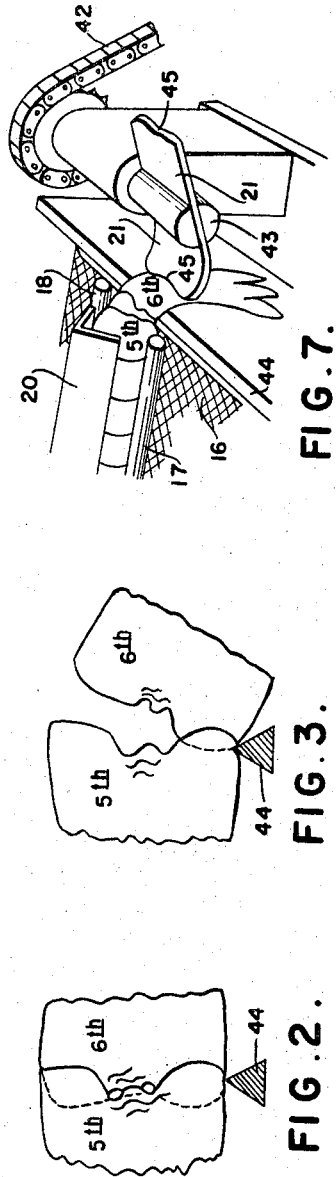
INVENTOR
Fernand S. Lapeyre

United States Patent Office 3,423,788
Patented Jan. 28, 1969

3,423,788
MACHINE FOR TREATING SHRIMP
Fernand S. Lapeyre, New Orleans, La., assignor to The Laitram Corporation, New Orleans, La., a corporation of Louisiana
Original application June 11, 1965, Ser. No. 463,290, now Patent No. 3,331,097, dated July 18, 1967. Divided and this application Sept. 9, 1966, Ser. No. 593,619
U.S. Cl. 17—2       8 Claims
Int. Cl. A22c 29/00

ABSTRACT OF THE DISCLOSURE

The present invention is directed to a machine for treating shrimp to break both of the condyle hinges between the fifth and sixth abdominal shell segments in which an immobilizing means is provided for immobilizing the fifth shell segment of a shrimp and a fulcrum is positioned relative to the immobilizing means for engaging the sixth shell segment in the immobilized position and a movable means having a single movement is positioned to cause movement of the sixth shell segment about the fulcrum while the fifth shell segment is held immovable by the immobilizing means so that the sixth shell segment moves away from shell segment number five.

---

This application is a division of my copending application, Ser. No. 463,290, filed June 11, 1965 now U.S. Patent No. 3,331,097 granted July 18, 1967.

An object of the invention is to break or disjoint the articulation between the 5th and 6th segments of a shrimp to the end that the first five abdominal segments may be peeled to expose the included meat, while the 6th abdominal segment is left intact along with the uropods and telson in a pattern which is generally referred to as fantail shrimp.

The articulation between the 5th and 6th shell segments of a shrimp is composed of what are technically referred to as lateral condyle hinges. Such hinges are two in number and the same are located at lateral portions of the segments. The object of the invention is to disjoin or pull apart the components of these segments by a single movement relatively between the 5th and 6th segments which preferably contemporaneously acts upon both lateral hinges in a movement which in effect pulls the components of the hinges apart.

A further object of the invention is to provide a process and machine for breaking or disjointing the lateral condyle hinges between the 5th and 6th abdominal segments to facilitate the later peeling of the first five segments subsequent to an incising or slitting operation performed on the dorsal side of the shrimp to and through the first five abdominal segments.

A still further object of the invention is to provide a machine by which shrimp may be brought in succession to an operative station, there halted in movement, immobilized, subjected to a hinge disjointing operation, subsequently released and moved to a discharge position while a subsequent shrimp is being brought into correct registry in the operating station to the immobilizing means.

The invention has for a further object to provide a continuous process by which shrimp are moved step-wise in continuous succession to an operating station wherein the 6th segments, after being arrested in motion and immobilized, are subjected to a substantially unidirectional thrust movement in a dorsal-to-ventral direction about a lateral fulcrum which is preferably substantially parallel with and displaced from the axial line passing through both lateral condyle hinges with the ultimate effect of pulling the 6th segments from the 5th segments so that both hinges are disjointed substantially simultaneously.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a schematic of a de-headed shrimp with applicable terminology applied thereto showing the raw product on which the improved process and apparatus operate.

FIGURE 2 is an enlarged fragmentary side elevational view of the articulation between the 5th and 6th shell abdominal segments showing the normal jointed condition thereof.

FIGURE 3 is a similar view showing the condition of the condyle hinges after being treated by the process and machine of the present invention.

FIGURE 7 is a fragmentary perspective view taken at the operating station showing a form of device by which the disjointing operation may be performed.

Referring more particularly to the drawings and initially to FIGURE 1 which illustrates the essential morphology of the shrimp, particularly the white shrimp (*Penaeus setiferus*) which is more particularly illustrated on pages 4, 5, 6 and 104 of Fishery Bulletin 145 by Joseph H. Young, from Fishery Bulletin of the Fish and Wildlife Service, volume 59, United States Department of the Interior.

FIGURE 1 illustrates a headless or de-headed shrimp showing that the body section containing the edible meat is enclosed in abdominal segments 1 to 6 inclusive, the 6th segment being directly connected to the uropods and the telson: such 6th segment being connected with the 5th segment by the lateral condyle hinges which provide the articulation between these segments by which the shrimp is enabled to assume the curled condition typical of the specie.

A detail of this articulation is shown more clearly on page 104 of the publication referred to. While there is a similar articulation between the 4th and 5th segments it does not possess the strength of the hinges between the 5th and 6th segments and as the 5th segment, along with segments 1, 2, 3 and 4, is to be incised and removed revealing the body meat, the invention is not concerned with the articulation between the 4th and 5th segments but only with the hinges between the 5th and 6th segments, as the latter are preferably to be disjointed, pulled out or broken advantageously before slitting the dorsal side of the shrimp as otherwise the undisturbed articulation at this point may become troublesome in securing fill and clean removal of the 5th segment and may cause tearing of the meat or other mutilation resulting in down-grading of the meat in the market.

FIGURE 2 shows the articulation between the 5th and 6th abdominal segments intact in its natural association.

FIGURE 3 shows that, by operation of the process and machine of the invention, the 6th segment has been displaced rearwardly as a result of the operation of the process and machine of this invention.

Figure 4:
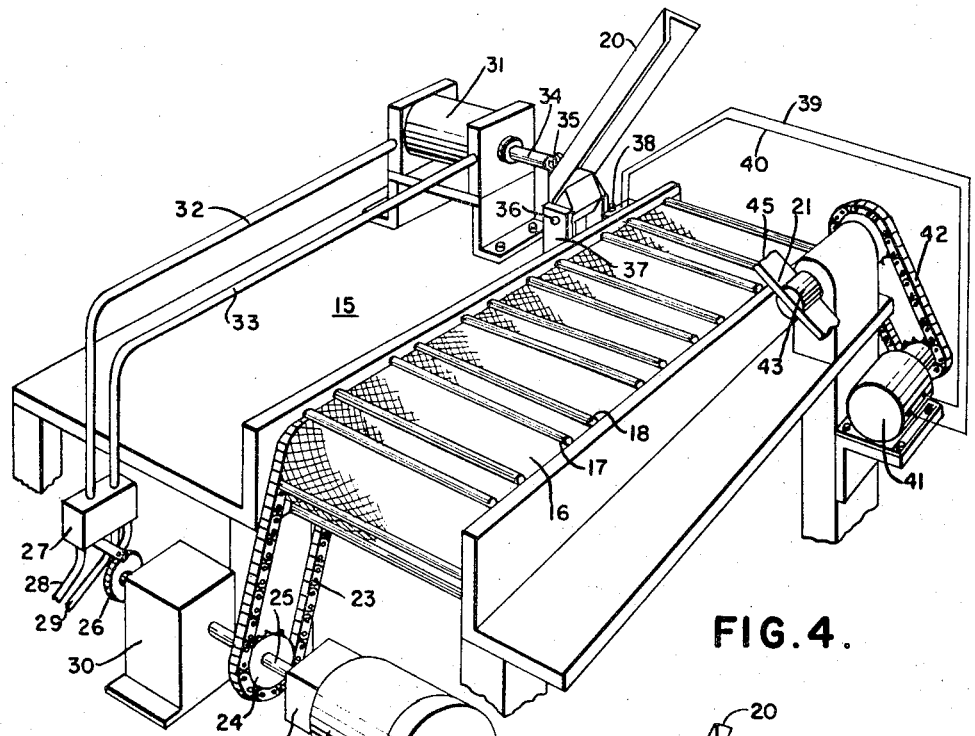
FIGURE 4 is a fragmentary perspective view showing one form of machine for carrying out the improved process.
Figure 6:
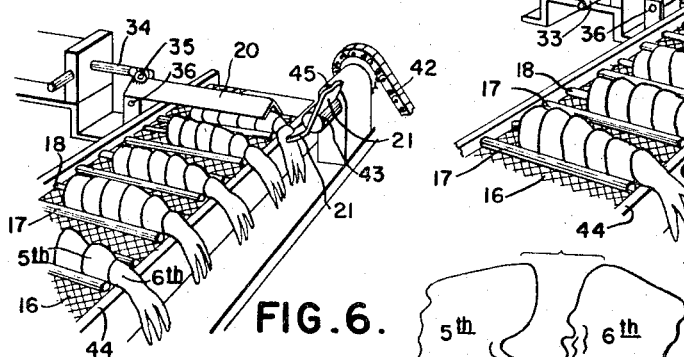
FIGURE 6 is a view similar to FIGURE 5 showing a shrimp immobilized and in the act of subjection to the disjointing operation.
Figure 5:
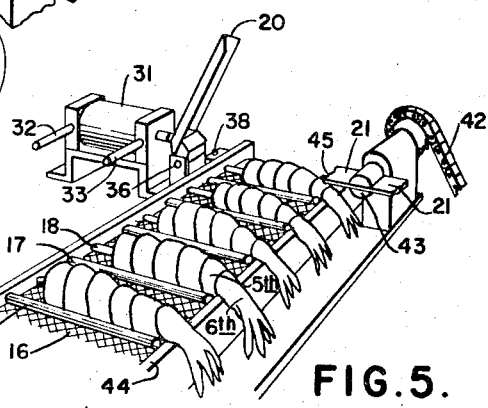
FIGURE 5 is a similar view with certain mechanical details omitted but showing the manner in which headless shrimp are placed upon a conveyor by which the same are moved in succession to an operating station.

Referring more particularly to FIGURES 4 to 7 inclusive, a form of machine is illustrated which includes a frame designated generally at 15 in which is mounted an endless conveyor 16, preferably of a flexible mesh type, on which are mounted cradles for the headless shrimp. These cradles may comprise rods or bars 17, 18 spaced apart a suitable distance for receiving and retaining the headless shrimp, as indicated in FIGURES 5, 6 and 7. These cradles are spaced apart suitable distances conforming to the dictates of an indexing mechanism 19 which requires that the conveyor be moved step-by-step through exact equal linear distances in order to register the shrimp accurately at an operating station to an immobilizing member 20 and a hinge disjointing member 21.

The conveyor 16 may be driven by any suitable motor 22; for instance, an electric motor incorporating the usual reduction gear, through a chain or other drive 23 from a drive sprocket 24 on the shaft 25 controlled by the indexing mechanism 19.

The indexing shaft 25 may also drive a cam 26 or other suitable mechanism for tripping a hydraulic valve 27 connected with hydraulic supply and return lines 28 and 29. The shaft 25 may, if desired, be stepped-up in rotation through a step-up gear 30 to assure sufficient rotation of the cam 26 to supply and withdraw hydraulic fluid to and from a hydraulic motor 31 by lines 32 and 33.

A plunger rod 34 of the motor 31 may be pivotally connected at 35 to the immobilizing member 20, which latter may be pivoted at 36 to upstanding brackets 37 on the frame 15.

Operation of the motor 31 is accordingly in timed relation to that of the conveyor 16 so that the immobilizing member 20 will be lowered upon a shrimp, as shown in FIGURES 6 and 7, at the operating station when the motor 22 and indexing mechanism 19 have moved the next in line shrimp on the conveyor in accurate registry at the operating station beneath the members 20 and 21.

In descending to the postion of FIGURE 6 the immobilizing member encounters and depresses a spring projected micro or other switch actuating button 38 for closing a circuit 39, 40 to a motor 41 connected through chain and sprocket drive 42, or otherwise, to a rotary shaft 43 on which the hinge disjoining member 21 is mounted. In this way the tail or hinge breaker may only be put in operation after the shrimp has been halted at the operating station and the immobilizing member 20 lowered to final position thereon.

As shown in FIGURES 5, 6 and 7, the shrimp are placed upon the conveyor belt 16 in the order and orientation illustrated in which the 6th abdominal segment overhangs an anvil 44 which may be a siding for the conveyor. This anvil serves to supply a fulcrum about which the 6th abdominal shell segment may be rocked or partially rotated incident to the downward striking or thrust movement of the break member 21 which may have one or more paddles, two such paddles being indicated in the drawing.

The free edges of the paddles may be incurved as indicated at 45 to conform generally to the curvature of the dorsal side of the 6th abdominal segment, as shown particularly in FIGURE 7 where the member 21 as shown as being flexed incident to the downward striking blow and the resistance thereto afforded by the 6th abdominal segment. In other words the so-called tail breaking member 21 may be of relatively stiff rubber contoured at its striking edges, as shown and referred to.

In operation, shrimp may be placed on the conveyor by hand or machine as the cradles rotate from the underside of the conveyor upwardly at the near end of the conveyor, as viewed in FIGURE 4. The conveyor moves step-by-step the distance between cradles and undergoes dwell periods at the operating station. At dwell periods the indexing mechanism halts each cradle in accurate registry with the immobilizing member, at which time the cam 26 has positioned the valve mechanism 27 to deliver pressurized fluid through the line 32 to the cylinder 31 of the motor, moving the piston and plunger rod 34 forwardly and lowering the immobilizing member 20 upon the shrimp occupying the incident cradle. This position of the parts is shown in FIGURE 6.

Incident to this movement of the immobilizing member 20 the circuit 39, 40 is closed through the valve actuating member 38 and motion of the breaker member 21 is generated by action of the motor 41. One or more strikes may be made by the paddles of the breaker member 21 which will rotate in a counterclockwise movement, as viewed in FIGURES 4, 5 and 6.

The breaker member 21 will descend on the tail portion of the shrimp which is overhanging the anvil 44 and tend to rock the tailpiece including the 6th abdominal shell segment about the axis defined by the upper edge of the anvil 44, thus causing a dorsal-to-ventral movement of the tailpiece in a substantially vertical or unidirectional movement which in effect will pull the lateral condyle hinges apart in a single rearward displacing movement. The fulcrum defined by the upper edge of the anvil 44 is preferably substantially parallel to the axial line connecting the two lateral condyle hinges between abdominal shell segments 5 and 6 so that simultaneous pulling action is exerted on both hinges.

The intermittent movement of the conveyor, the subsequent movement of the immobilizing member and the consequent operation of the breaker member are all timed in a definite sequence in which a preselected linear travel of the conveyor between dwell periods acts to set in motion the motor for lowering the immobilizing member 20, and the final descending movement of the immobilizing member sets in motion the tail breaking member.

In FIGURE 2 the shrimp is so placed that the fulcrum is located directly under the condyle axis.

FIGURE 3 shows the position of abdominal shell segment 6 after the breaker member has rocked the 6th segment about this fulcrum, showing the separation of the components of the hinges.

Figure 8:
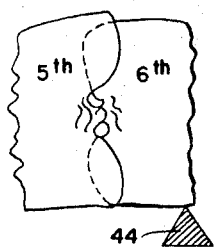
FIGURE 8 is an enlarged fragmentary side elevational view of the articulation between the 5th and 6th shell abdominal segments showing the placement of the shrimp so that the fulcrum is beneath the 6th segment aft of the vertical line passing through the hinge axis.

FIGURE 8 shows that the shrimp has been so placed that the fulcrum is now placed aft of a vertical line running through the axis of the two condyle hinges.

Figure 9:
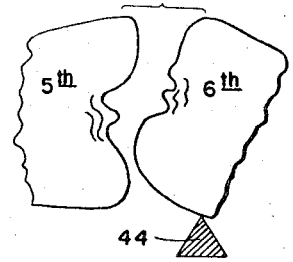
FIGURE 9 is a similar view showing the separation of the condyle hinges and the position of the 6th segment after the hinges have been pulled apart.

FIGURE 9 shows the rocked position of the 6th segment after being operated on by the breaker member.

What is claimed is:

1. A machine for treating shrimp to break both of the condyle hinges between the 5th and 6th abdominal shell segments comprising
   (a) immobilizing means for substantially immobilizing at least shell segment 5,
   (b) a fulcrum positioned relatively to the immobilizing means for engaging the 6th shell segment in the immobilized position, and
   (c) movable means for causing a single movement of the 6th shell segment about the fulcrum while the 5th segment is held immovable by the immobilizing means so that the 6th shell segment moves away from shell segment 5.

2. A machine as claimed in claim 1, wherein the fulcrum establishes an axis about which the 6th segment moves, such axis being displaced from the axis passing through both natural condyle hinges.

3. A machine as claimed in claim 2, wherein the fulcrum axis and the axis through the two condyle hinges between segments 5 and 6 are substantially parallel.

4. A machine for treating shrimp to break the articulation between the 5th and 6th abdominal shell segments comprising
   (a) a fulcrum on which the 6th abdominal segment is adapted to be placed, and
   (b) means positioned relatively to the fulcrum for engaging the 6th segment to cause pivoting in a dorsal-to-ventral direction of the 6th segment relatively to the 5th segment for levering the condyle hinges apart.

5. A machine for treating shrimp to break the articulation between the 5th and 6th abdominal shell segments comprising
   (a) a fulcrum for receiving the 6th shell segment,
   (b) immobilizing means for immobilizing at least shell segment 5, and
   (c) actuating means for pivoting the 6th segment about the fulcrum causing movement of the 6th segment relative to the 5th segment in a direction to pull the hinges apart.

6. A machine for treating shrimp comprising
   (a) an operating station,
   (b) a conveyor having spaced shrimp receiving cradles,
   (c) indexing means for driving the conveyor stepwise to accurately register the shrimp with the station,
   (d) normally inactive immobilizing means as the station,
   (e) actuating means coordinated with the indexing means for shifting the immobilizing means into engagement with the shrimp when the latter arrive at the station and the conveyor is halted, and
   (f) breaker means at the station actuated in timed relation to the shifting of the immobilizing means for exerting thrust upon the 6th abdominal shell segment to cause relative movement between the 5th and 6th segments to an extent to separate the components of the lateral condyle hinges between said segments.

7. A machine for treating shrimp comprising
   (a) a conveyor,
   (b) cradles for receiving shrimp crosswise of the conveyor at equi-distant linear intervals,
   (c) an operating station to which the shrimp are successively brought by the conveyor,
   (d) indexing drive means for moving the conveyor stepwise toward the operating station with dwell periods occurring at the station for accurately registering the cradles with the station,
   (e) movable immobilizing means at the station positioned to engage the shrimp at the dwell periods, and
   (f) tail joint breaker means at the station positioned to encounter the tailpiece of the shrimp and engender a movement therein resulting in dislocation of the lateral condyle hinges between the 5th and 6th abdominal shell segments.

8. A machine for treating shrimp as claimed in claim 7, further comprising
   (g) immobilizing means operating means synchronized with the conveyor driving means for moving the immobilizing means against a shrimp at said station, and
   (h) actuating means for the tail joint breaker means synchronized with the shrimp engaging movement of the immobilizing means to cause actuation of the tail joint breaker means only subsequent in time to the immobilizing of the shrimp at the station by the immobilizing means.

References Cited

UNITED STATES PATENTS

| | | | |
|---|---|---|---|
| 2,716,776 | 9/1955 | Streich et al. | 17—2 |
| 2,974,356 | 3/1961 | Cerny | 17—2 |
| 3,247,542 | 4/1966 | Jonsson | 17—2 |
| 3,310,832 | 3/1967 | Ambos et al. | 17—2 |

LUCIE H. LAUDENSLAGER, *Primary Examiner.*